United States Patent [19]
Allen et al.

[11] 3,946,634
[45] Mar. 30, 1976

[54] BAND MILL STRAIN MECHANISM

[75] Inventors: Francis Edwin Allen, North Vancouver; James Daniel McGuire, Surrey, both of Canada

[73] Assignee: Letson and Burpee Ltd., Vancouver, Canada

[22] Filed: Dec. 7, 1973

[21] Appl. No.: 422,732

Related U.S. Application Data
[62] Division of Ser. No. 240,649, April 3, 1972, Pat. No. 3,810,409.

[52] U.S. Cl. .................................. 83/819; 83/818
[51] Int. Cl.² .................... B27B 13/08; B23D 55/10
[58] Field of Search ............ 83/818, 819, 816, 788; 267/122

[56] References Cited
UNITED STATES PATENTS

| | | | |
|---|---|---|---|
| 532,663 | 1/1895 | Hanson | 83/818 |
| 693,337 | 2/1902 | Thomas | 83/819 |
| 879,500 | 2/1908 | Stevens | 83/818 |
| 2,729,003 | 1/1956 | Cohn et al. | 267/122 |
| 2,973,015 | 2/1961 | Thompson | 267/122 |

*Primary Examiner*—Donald R. Schran
*Attorney, Agent, or Firm*—Carver and Company

[57] ABSTRACT

Strain mechanism for bandmill using deadweight lever mechanism in which undesirable effects of inertia of counterweight and friction at knife edges are reduced. Rolling diaphragm air cylinder is used in one of three positions. In first position cylinder extends between arbor carrier arm and plunger tube and supplies portion of saw strain permitting lighter counterweight. In second position it extends between counterweight arm and plunger tube and eliminates counterweights. In third position counterweight is supported on counterweight arm by yoke supported by cylinder which resiliently mounts weight.

10 Claims, 17 Drawing Figures

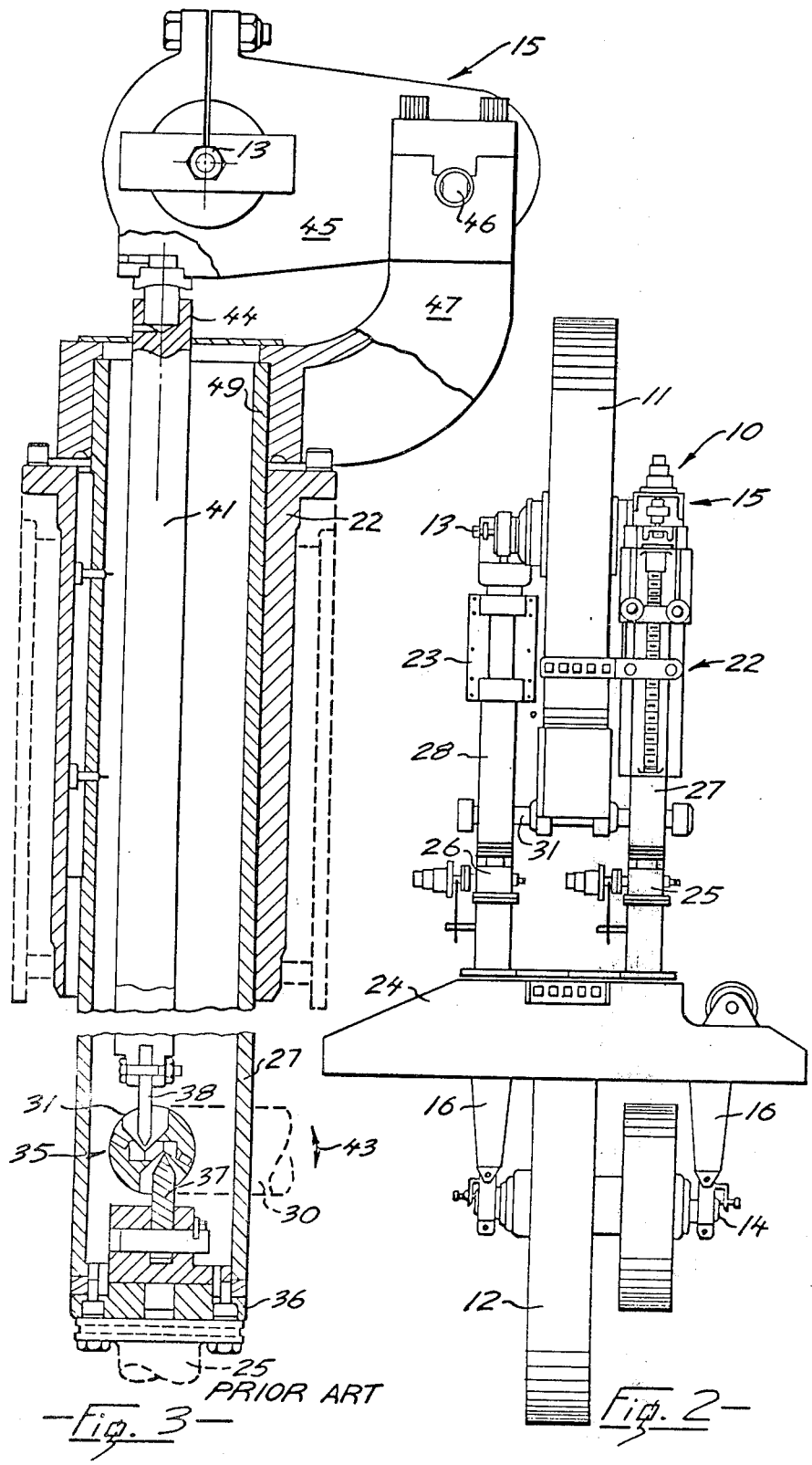

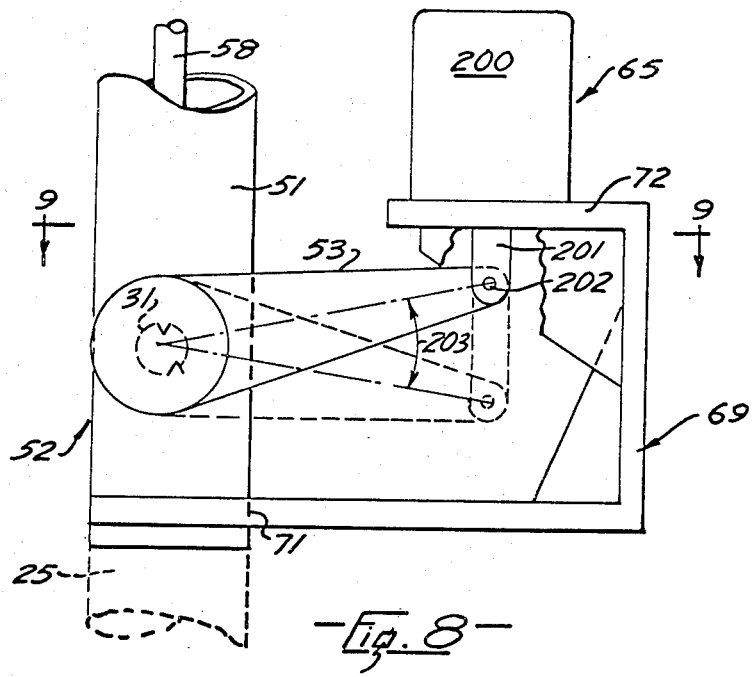
-Fig. 8-
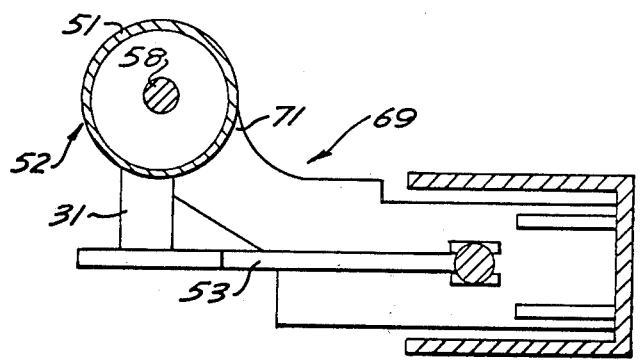
-Fig. 9-

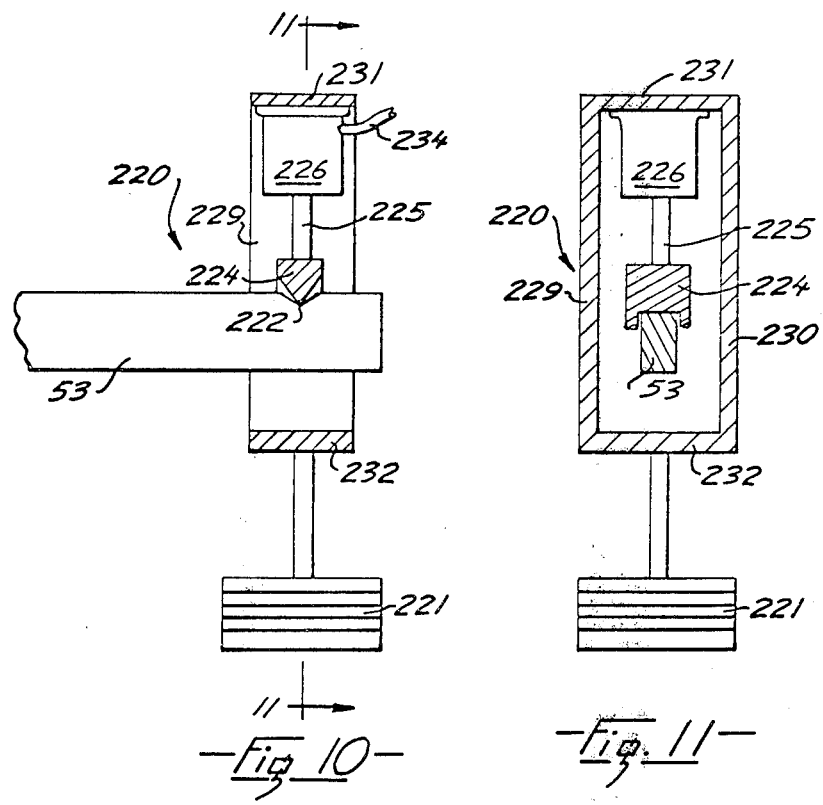
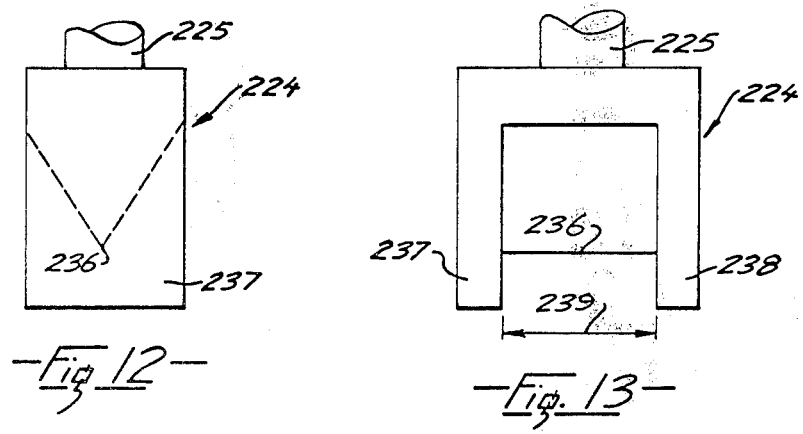

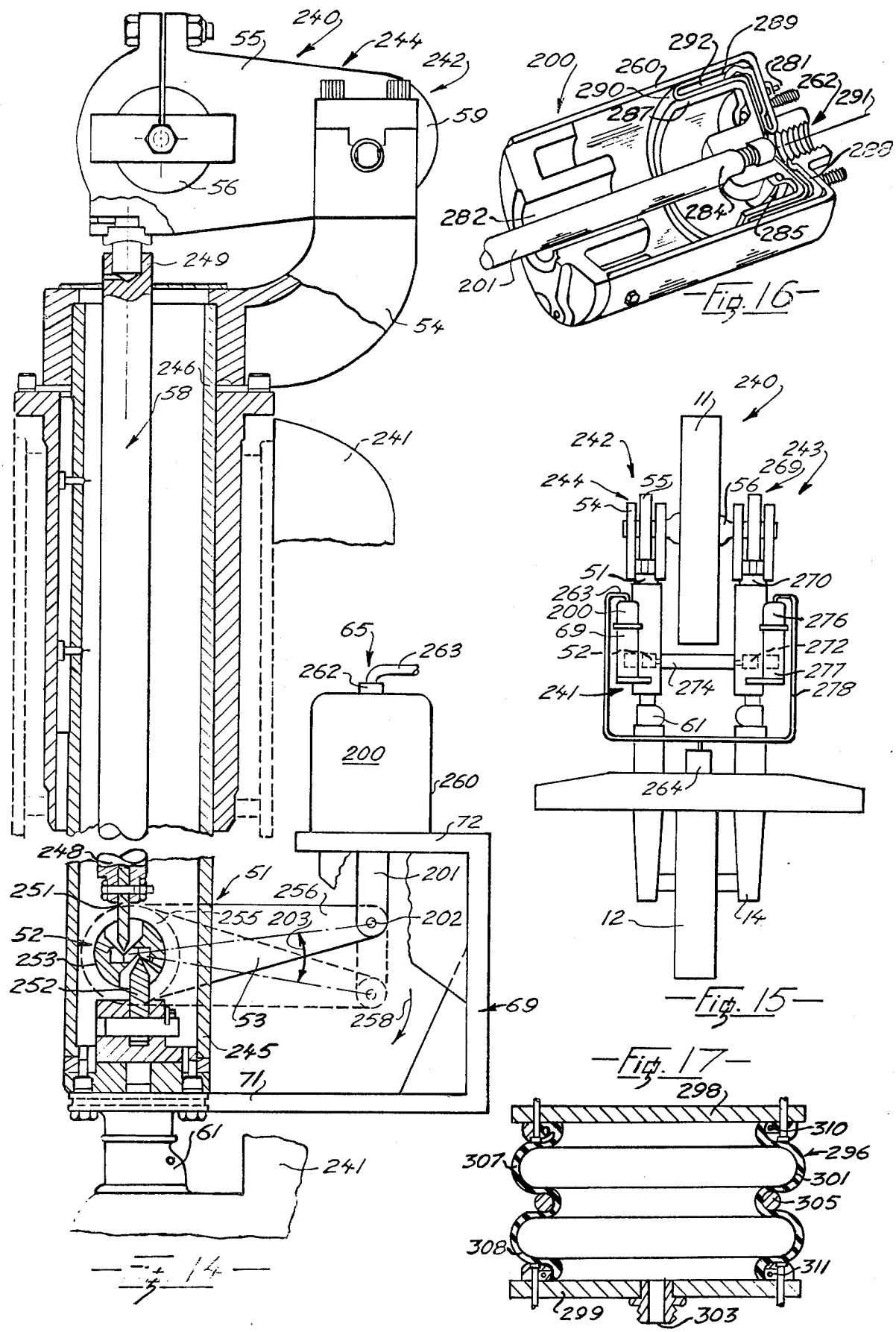

BAND MILL STRAIN MECHANISM

This is a division of Ser. No. 240,649, filed Apr. 3, 1972, now U.S. Pat. No. 3,810,409.

BACKGROUND OF THE INVENTION

1. Field of the Invention

The invention relates to improvements in strain mechanisms as used on bandmills, particularly bandmills as used in the lumber processing industry.

2. Prior Art

A bandmill has an endless saw running on spaced co-planar wheels, the wheels being journalled on arbors, the saw being strained by forcing the arbors apart. A common means to strain the saw uses a deadweight lever mechanism in which a weighted counterweight arm, through a knife-edge system, exerts an axial force on a strain rod, the strain rod acting indirectly on one of the arbors, tending to force the arbors apart. This system has been used with success for many years, but fluctuations in the cutting load produce excessive tension in the saw such that life of the saw is reduced, and quality of cutting is impaired. Excessive tension results from slow response of the strain system to accommodate rapidly applied additional forces on the saw resulting from, for instance, lateral deflection of the saw, such slow response being attributed to friction occuring between the knife-edges and knife-edge seats, and inertia of the weighted lever arm. Undesirable effects of friction and inertia are accentuated in high strain bandmills.

SUMMARY OF THE INVENTION

The invention reduces difficulties above in the prior art by providing a strain system having relatively low inertia and a strain system in which energy losses due to friction are reduced. The invention is particularly adapted for, but not limited to, converting an existing bandmill using a deadweight lever mechanism to a resilient strain system according to the invention. The invention has particular advantages in converting an existing high strain bandmill.

An existing bandmill can be converted by using a rolling diaphragm air cylinder mounted in one or more of three positions on the bandmill, the air cylinder communicating with an air reservoir maintained at a controlled constant pressure. The air cylinder as above is one type of air spring, which spring provides an essentially frictionless resilient mounting to be described.

The air cylinder extends between a coupling means cooperating with the arbor carrier arm of the bandmill, and a reaction means which provides an equal and opposite reaction to maintain the cylinder in equilibrium.

In a first position of the cylinder, the cylinder extends between a means secured to an upper end of a plunger tube and a carrier arm of the upper wheel support. A lighter counterweight is used on the counterweight arm to apply a portion of the strain and extension of the cylinder applies a remaining portion of the strain.

In a second position of the cylinder, the counterweight is eliminated and the cylinder extends between a bracket on the plunger tube and the counterweight arm.

In a third position of the cylinder, a counterweight of usual weight is used on the arm but is mounted on a yoke which is carried by the air cylinder, thus providing a resiliently mounted weight which reduces effects of inertia in the strain mechanism.

If desired, advantages of a resiliently mounted weight can be combined with the air cylinder mounted in the first position. Other combinations within the invention are possible.

A detailed description following, related to drawings, gives exemplification of apparatus according to the invention which, however, is capable of expression in structure other than that particularly described and illustrated.

DESCRIPTION OF THE DRAWINGS

FIG. 2 is a simplified end elevation of the bandmill as seen from 2—2, FIG. 1,

FIG. 3 is a simplified fragmented section of a prior art strain system as seen on 3—3, FIG. 2, FIG. 8 is a simplified side elevation of a lower end of a plunger tube, showing a second position of a rolling diaphragm air cylinder, FIG. 9 is a simplified plan view on 9—9 of FIG. 8, some portions being shown in section, FIG. 10 is a fragmented side elevation of the air cylinder in a third position in which a counterweight is resiliently mounted, some portions being removed for clarity, FIG. 11 is a simplified fragmented section on 11—11 of FIG. 10, some portions not shown in section, FIG. 12 is a fragmented side elevation of a knife-edge mounting of FIG. 10, FIG. 13 is an end elevation of the knife-edge mounting of FIG. 12.

FIG. 14 is a simplified fragmented side elevation showing one portion of a strain mechanism according to the invention, the air cylinder being fitted in the position as shown in FIG. 8, FIG. 15 is a simplified, diagrammatic rear elevation of the bandmill of FIG. 14, FIG. 16 is fragmented perspective showing a typical rolling diaphragm air cylinder type of air spring, FIG. 17 is a simplified fragmented section showing a bellows type of air spring.

DETAILED DISCLOSURE

Figure 1:
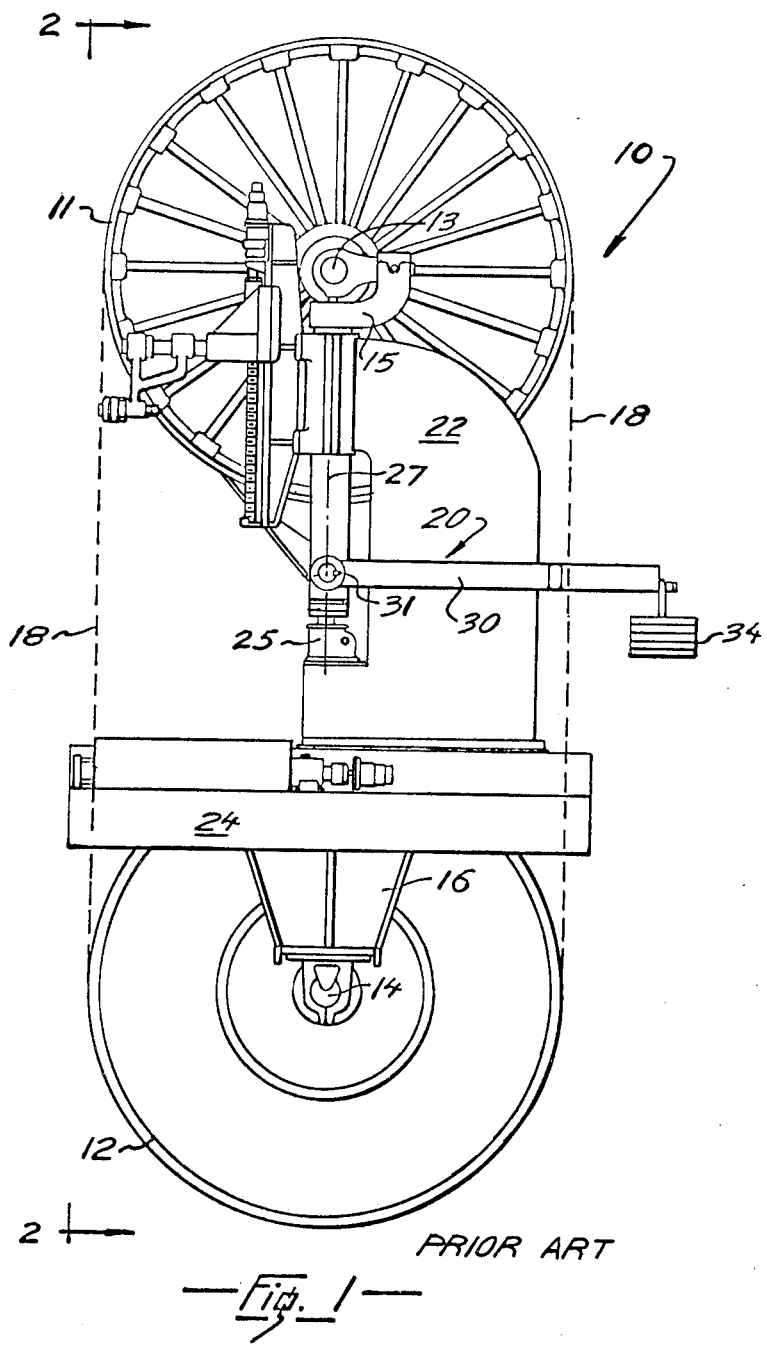
FIG. 1 is a simplified side elevation of a prior art bandmill.

FIGS. 1 through 3 are Prior Art

FIGS. 1 and 2

A prior art bandmill 10 has upper and lower wheels 11 and 12 journalled on arbors 13 and 14, the arbors carried in upper and lower wheel supports 15 and 16. An endless saw 18 (shown only in FIG. 1 in broken outline) runs on the two wheels, the lower wheel 12 being powered from the arbor 14 and the upper wheel 11 being driven by the saw, and forced apart from the wheel 12 by a deadweight strain mechanism 20, which strains the saw to a predetermined load.

Side columns 22 and 23 extend from a base 24 to a position below the upper wheel support 15, which support is carried on plungers 27 and 28. The plungers 27 and 28 herein are tubes having bores for reasons to be described. With modifications the plungers can be solid. The upper wheel support is raised or lowered by lifting devices 25 and 26 provided at inner ends of the plunger tubes 27 and 28. The strain system 20 includes a counterweight arm 30 having an inner end secured to a rocker shaft 31 and an outer end supporting a counterweight 34. Fig. 3

The strain system has essentially similar first and second portions associated with each plunger, the first portion having a knife edge seat assembly 35 cooperating with the rocker shaft 31, which shaft is subjected to a turning moment produced by the counterweight 34 acting on the arm 30. The assembly 35 has first and second knives 37 and 38 in engagement with knife seats of a seat portion 40 coupled to the rocker shaft, the first knife 37 being secured to an inner end of a strain rod 41.

Rotation of the rocker shaft moves the counterweight arm 30 (broken outline) as shown by an arrow 43. An outer end 44 of the strain rod is in engagement with a carrier arm 45 of the wheel support 15, the carrier arm being hinged for rotation about a pin 46 at an upper end of a yoke 47. The yoke 47 is secured to an upper end 49 of the plunger, clearance being provided to permit axial movement of the strain rod relative to the plunger.

The plunger tube is free to slide axially within the column 22, when the lifting device 25 is extended or retracted for setting the strain of the saw or changing a saw. When the saw is strained and in equilibrium, anticlockwise moments on the seat portion from the strain rod are balanced by clockwise moments on the seat portion 40 due to the weight 34 (FIGS. 1 and 2) acting on the arm 30. With a constant load on the saw, the weight 34 is stationary, however when the saw is operating and variations in cutting forces occur, particularly if the saw is deflected transversely, the anti-clockwise moments on the knife seat element fluctuate and there is a tendency for the weight 34 to move, which tendency is reduced and delayed by inertia of the weight and friction between components of the strain mechanism. Hereinafter, the time between an instant of applying an additional load to the saw and the instant the strain system responds to that additional load is termed response of the strain system. Slow response of prior art strain systems is attributed to the inertia and friction above.

FIG. 4

A strain mechanism 50 according to the invention has essentially similar first and second portions of means to strain the saw, the first portion only being shown, which portion, includes a plunger tube 51, having a knife edge seat assembly 52 and a counterweight or torque arm 53. The plunger tube 51 has a yoke 54 hinging a carrier arm 55 which supports one end of an arbor 56 carrying the upper wheel (not shown). A plunger tube lifting device 61 at a lower end of the plunger tube 51 is for changing the saw and setting the strain. The foregoing applies to the present invention and is also common to the conventional deadweight strain mechanism of a prior art bandmill shown in FIGS. 1, 2 and 3, thus the present invention is particularly adapted to convert existing bandmills to a strain mechanism according to the invention.

A central concept of the invention is to provide a strain system in which effects of friction and inertia are less than in the strain systems of prior art bandmills so as to improve response of the system, that is to reduce time delay above. With an improved response, the strain system can respond to a sudden increase in load on the saw, thus reducing strain fluctuations, with a corresponding increase in accuracy of cut, other factors remaining unchanged.

Effects of friction and inertia are reduced by using a resilient means to apply load to the counterweight arm instead of the counterweights, or by using the resilient means to apply a portion of the strain in combination with lighter counterweights, or to mount the counterweight resiliently.

The resilient means to apply load to strain the saw is an extensible and retractable rolling diaphragm air cylinder. The air cylinder can be mounted in one of three positions to be described, or if desired a combination of two positions can be used. A rolling diaphragm air cylinder is one example of an air spring for use in the invention. Such air springs have a chamber defined in part by a flexible membrane, two examples being illustrated in FIGS. 16 and 17.

It is of particular importance that an air spring such as a rolling diaphragm air cylinder is used, as opposed to a conventional pneumatic cylinder. In a conventional pneumatic cylinder, friction between piston and cylinder produces a cylinder that is relatively unyielding and does not respond sufficiently quickly to absorb fluctuating loads that occur during sawing. Compared with a conventional pneumatic cylinder, in a rolling diaphragm air cylinder, effects of friction and leakage are negligible. A suitable rolling diaphragm air cylinder is manufactured by the Bellofram Corporation of Massachusettes, United States of America, Bellofram being a registered trade mark of the Bellofram Products Company, a division of the above corporation. One particular cylinder that has been used with success is a no-spring return, single acting type, as described in the Bellofram catalogue AC-500-C (6–67) on page 11 as series E or F and shown in FIG. 16 herein. Hereinafter, the term air cylinder refers to a rolling diaphragm air cylinder or equivalent air spring as above.

A first position of the air cylinder is shown in broken outline at 64, the cylinder extending between the carrier arm, in this instance an outer end 60 of the carrier arm, and a means secured to an upper end of the plunger tube, in this instance an extension 63 of the yoke 54. Thus extension of the cylinder rotates the carrier arm 55 in a direction of an arrow 57 about an inner end 59, this rotation being followed by movement of the strain rod. Thus, with a counterweight (not shown) on the arm 53 acting in a direction of arrow 62 counterweight strain is additional to that supplied by the cylinder, thus less counterweight is required than in prior art bandmills, thus reducing effects of inertia and friction that are inherent with a heavier counterweight. As the extension 63 moves with the plunger tube 51, raising and lowering the plunger tube concurrently raises and lowers the air cylinders, thus stroke of the air cylinder can be relatively small, sufficient to accommodate changes in effective saw length, usually about one quarter of an inch. The upper wheel arbor is supported in two carrier arms, thus two cylinders are required, one for each arm. This position is described with reference to FIG. 7.

A second position of the air cylinder is shown in broken outline at 65, the cylinder extending from a bracket 69 on the plunger and the counterweight arm. A inner end 71 of the bracket is secured to the plunger tube 51, and an outer end 72 of the bracket provides a mounting for the air cylinder. The cylinder extends between a point 74 on the arm 53 and the end 72 of the bracket, such that extension of the cylinder forces the arm in a direction of arrow 76, increasing strain on the saw. As the bracket 69 is secured to the plunger 51, raising and lowering the plunger concurrently raises and lowers the cylinder, thus the stroke of the jack can also be relatively small, of the order of one inch. This position is described with reference to FIGS. 8, 9, 14 and 15.

A third position of the air cylinder is shown in broken outline at 84, the cylinder supporting a yoke 85 interposed between a counterweight and the counterweight arm so as to mount the weight resiliently. This position is described with reference to FIGS. 10 through 13.

With the air cylinder in the first position, the carrier arm is a coupling means cooperating directly with the air cylinder to transmit force from the cylinder to the carrier, and the means secured to the plunger tube serves as a reaction means cooperating with the air cylinder to apply an equal and opposite reaction to the cylinder to maintain the cylinder in equilibrium. With the air cylinder in the second and third positions, the strain rod, the knife edge seat assembly and the counterweight arm serve as coupling means cooperating with the air cylinder to transmit force from the cylinder to the carrier. The bracket 69 secured to the plunger tube and the yoke 85 also serve as reaction means cooperating with the air cylinder to apply an equal and opposite reaction the cylinder to maintain the cylinder in equilibrium.

FIG. 5

A rolling diaphragm air cylinder is responsive to small changes in air pressure and to reduce chances of undesirable strain fluctuations resulting from variations in pressure from conventional pressurized air sources, a supply of pressurized air at substantially constant pressure is used. This is supplied by a constant air pressure means 90 according to the invention which includes a deadweight lever mechanism 92, similar to the strain mechanism used to strain the saw. The constant air pressure supply is used with cylinders in the first and second positions only — it is not required for cylinders in the third position. If accurate air pressure gauges are available, i.e. gauges reading to ±1 psi, and three or more are used as a backup safety measure, the means 90 of FIGS. 5 and 6 can be eliminated, a suitable constant pressure reservoir being substituted.

The means 90 is supplied with air from a compressor (not shown) through a line 93 feeding air through a manually-operated shut-off valve 95 into a reservoir 96. Lines 98 extending from the reservoir are siamesed into a first junction, air pressure at the junction being read by a gauge 101. Excess air is exhausted through an exhaust valve 103. An expansion allowance means 105 communicates with the air in the reservoir through a line 104, and maintains air pressure in the reservoir substantially constant for normal temperature changes in a sawmill. When temperatures are fairly constant, the means 105 can be omitted.

From a second junction 100, a line 106 feeds into a rolling diaphragm air cylinder 108 of the deadweight mechanism 92. A rod 110 of the cylinder 108 bears against a counterweight arm 112, the arm being hinged at an inner end 113 mounted on a portion of framework 126, the arm carrying a counterweight 116 at an outer end 114. Clockwise moments on the arm generated by the weight 115 are counteracted by anti-clockwise moments from an upward force from the cylinder 108. Upper and lower stops 118 and 119 are provided to limit movement of the arm.

Figure 4:
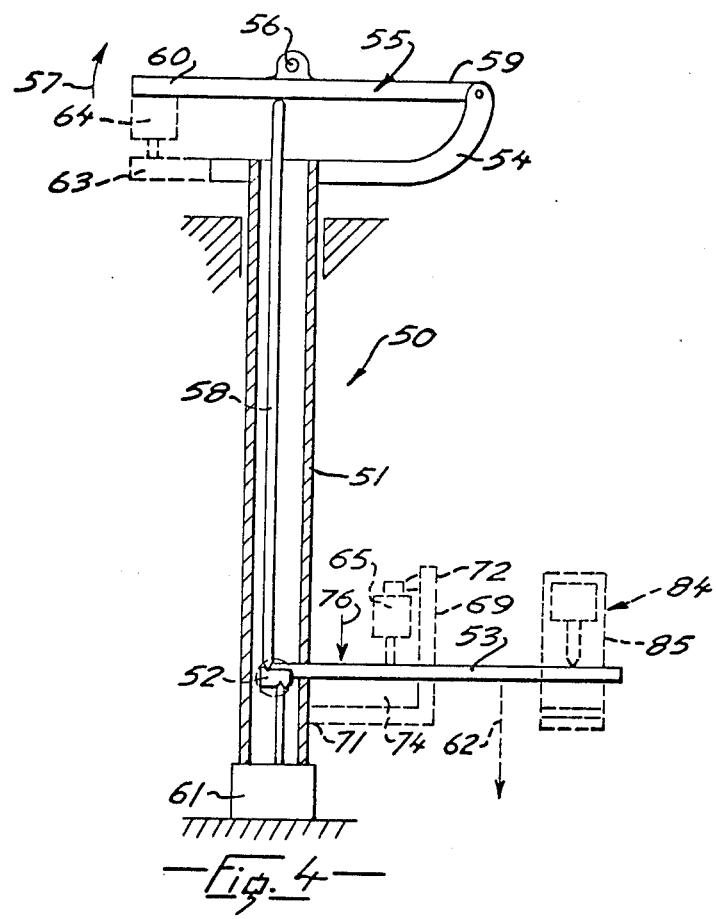
FIG. 4 is a simplified fragmented diagram of a portion of the strain system according to the invention, showing alternative positions of rolling diaphragm air cylinders for applying saw strain.

A second line 121 extends from the junction 100 and communicates with a rolling diaphragm air cylinder 120, connected to the bandmill in one of the two positions of FIG. 4. It should be noted that two air cylinders are used in the first position, and two can be used in the second position, a second cylinder being shown in broken outline at 120.1. Simple strain-ratio calculations are required to provide a measure of saw strain, parameters relating to the strain include air pressure in the cylinders, effective cross-sectional areas of the cylinder 108 in the mechanism 92, and the cylinders in the bandmill and moment arms relating to the bandmill and the mechanism 92.

FIG. 6

Figure 5:
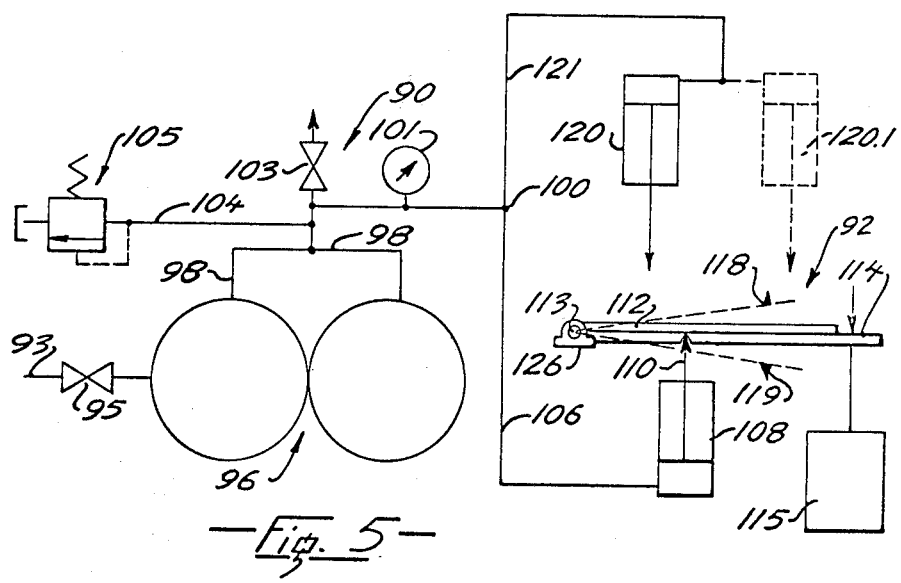
FIG. 5 is a schematic of a pneumatic circuit for applying strain to a bandmill using a rolling diaphragm air cylinder strain system according to the invention, the circuit providing a substantially constant and accurately known air pressure.
Figure 6:
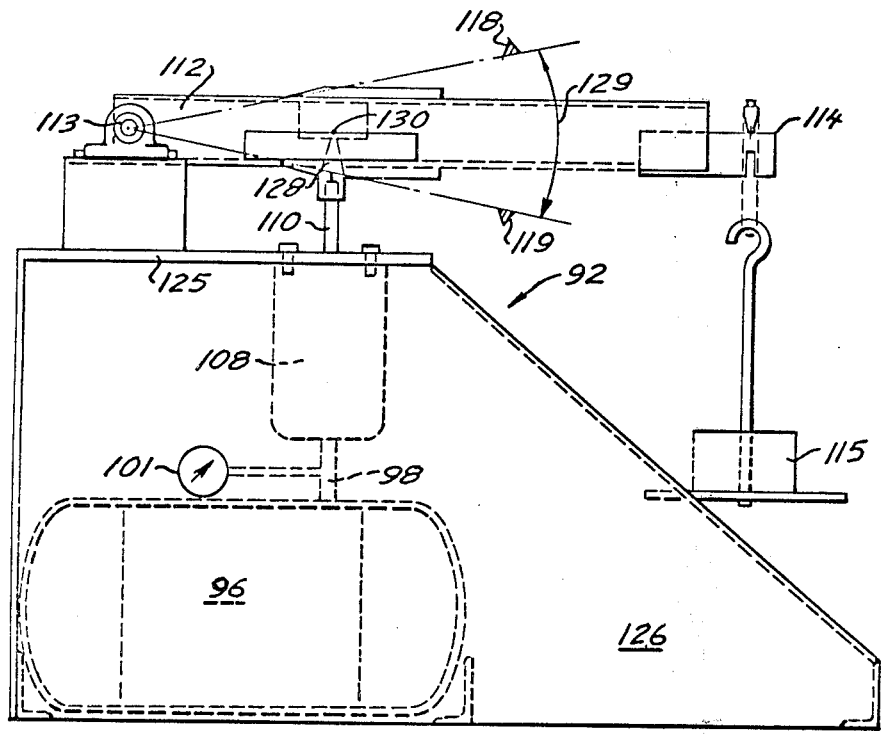
FIG. 6 is a simplified side elevation of a deadweight lever mechanism of a constant air pressure supply.

The deadweight lever mechanism 92 shown schematically in FIG. 5 has the rolling diaphragm air cylinder 108 secured to an upper platform 125 of the framework 126. The reservoir 96 communicates through lines 98 with the cylinder 108, the rod 110 having a knife edge 129 at an upper end in engagement with a knife seat 130 of the arm 112. The arm 112 can rotate about the hinge 113 through an angle 129 of the order of about 20°, sufficient to accommodate normal fluctuations of the arm 112. The stroke of the cylinder 108 can be of the order of four inches, the stops 118 and 119 limiting movement as previously described. A particular advantage of this mechanism is that an operator of the bandmill uses weights to set the strain, and the simple strain-ratio calculation is all that is required to assess strain, such calculation being similar to prior art calculation.

FIG. 7

Figure 7:
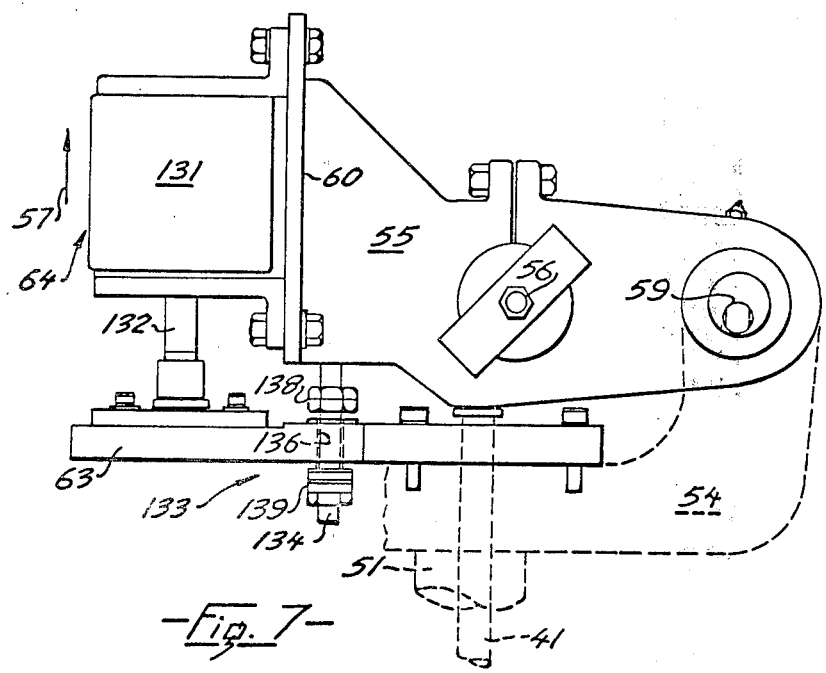
FIG. 7 is a simplified fragmented side elevation of an upper arbor of a bandmill showing a first position of a rolling diaphragm air cylinder.

In the first position 64 (FIG. 4) of the air cylinder, the cylinder extends between the plunger tube 51 and the arbor carrier arm 55. In FIG. 7, a rolling diaphragm air cylinder 131 has a piston rod 132 extending downwards in engagement with the extension 63 of the yoke 54 (broken outline). A bolt 134 extending downwards from the end 60 of the carrier passes through a hole 136 (broken outline) in the extension 63, the bolt carrying upper and lower stops 138 and 139. Thus, travel of the yoke relative to the extension 63 is limited by the stops 138 and 139, thus protecting the rolling diaphragm cylinder which has a stroke of about one inch. Saw strain can be calculated from force due to air pressure in the cylinder 131, plus force from a corresponding cylinder (not shown) on an opposite carrier arm, plus additional strain from the conventional counterweight (not shown), the counterweight usually accounting for about one third of total saw strain. When changing the saw, movement of the plunger tubes also moves the extension 63 and thus stroke of the cylinder 131 is not required to accommodate full travel of the plunger tube.

FIGS. 8 and 9

In the second position 65 (FIG. 4) the inner end 71 of the bracket 69 is secured to a lower end of the plunger 51, the bracket carrying a rolling diaphragm cylinder 200. The counterweight arm 53 extends from the rocker shaft 31 (broken outline), an outer end of the shaft being hinged at a pin 202 to a lower end of a piston rod 201 of the cylinder 200. The bracket 69 has the outer end 72 carrying the cylinder 200 and when changing the saw, operation of the raising or lowering device 25 (broken outline) moves the plunger 51 and the bracket 69. Thus stroke of the cylinder does not have to accommodate full travel of the plungers, and is about four inches dependent on length of the arm 53. Extension of the piston rod 201 rotates the arm 53 through an arc 203, thus rotating the rocker shaft 31, and with it the knife edge assembly 52 to strain of the saw. This embodiment is further described with reference to FIGS. 14 and 15.

FIGS. 10 and 11

An alternative means of applying load to the counterweight arm 53 is to mount the counterweight resiliently, thus reducing effects of inertia of the weight. The counterweight arm 53 cooperates with a yoke 220 carrying counterweight 221. A knife seat 222 on the arm 53 carries a knife edge assembly 224 at a lower end of a piston rod 225 of a rolling diaphragm air cylinder 226. The yoke 220 has parallel side members 229 and 230 straddling the carrier arm, the side members being joined by parallel top and bottom members 231 and 232. The cylinder 226 is secured to the top member 231, the piston rod extending downwards. A hose 234 extends from the air cylinder 226 to an air reservoir (not shown), pressure in the air reservoir being adjusted so that the piston in the cylinder balances at an approximate mid-stroke position to provide maximum length of stroke in either direction to absorb fluctuation. In this position saw strain is obtained from strain ratio calculations based on the counterweight — air pressure in the cylinder having no effect on strain ratio. The piston rod is carried in low friction bearings which provide transverse support for the piston rod so as to reduce binding between the piston rod, the piston and the cylinder. The bearings are suitably linear ball bushings or an air bearing adapted for axial movement between the rod and bearing. Conventional bearings supplied by Bellofram (trademark) are too close-coupled to provide adequate lateral support and longer bearings are substituted, of the order of 6 inches.

Resilient mounting of the weight 221 reduces load on the saw due to fluctuations occuring during sawing by permitting the weight to remain substantially stationary whilst small oscillations of the counterweight arm are absorbed by the air cylinder 226. Thus, inertia effects of the weight are reduced. A particular advantage in mounting the cylinder in the third position is that if air pressure in the cylinder fails, the piston "bottoms" in the cylinder and the saw does not lose strain, thus it is failsafe. Resilient mounting of the weight can be used in combination with an air cylinder mounted on the carrier arm in the first position 64 (FIG. 4), which combination reduces effects of both friction and inertia.

FIGS. 12 and 13

The knife edge assembly 224 has a knife edge 236 (broken outline) straddled by two downwardly extending guides 237 and 238 spaced at a distance somewhat greater than width of the counterweight arm 53 to provide clearance for the knife edge assembly and the counterweight arm. The guides reduce a tendency of the knife edge 236 to roll or slide sideways off the knife seat 222 (FIG. 15).

FIGS. 14 and 15

A bandmill 240 according to the invention has a column 241 which supports similar first and second portions 242 and 243 of the strain mechanism 50, which serves as a means to strain the saw. The first portion 242 includes the carrier arm 55 and the yoke 54, which together form an upper or first wheel support 244 to carry the upper or first arbor 56. The inner end 59 of the carrier arm is hinged to the yoke 54 to permit swinging of the carrier arm relative to the plunger 51 to strain the saw. The upper or first wheel 11 is journalled on the first arbor 56 and the lower or second wheel 12 is journalled on the lower or second arbor 14, the endless saw 18 (not shown) being mounted and driven by the wheels. The plunger 51 has inner and outer ends 245 and 246 and cooperates with the first wheel support 244. The plunger is supported in the column and, with the first wheel support 244 can be moved axially relative to the column by the lifting device 61 so as to strain the saw, similarly to the support 15 and plunger 27 of FIG. 1.

The strain rod 58 has an outer end 249 cooperation with the wheel support and an inner end 248 having a first knife 251 of the knife edge seat assembly 52. The assembly 52 includes a second knife 252 secured to the inner end 245 of the plunger, the first and second knives cooperating with respective seats in a seat portion 253. The torque arm 53 has an inner end 255 coupled to the seat portion 253, and an outer end 256 coupled to the pin 202 connected to the piston rod 201 of the air spring 200. Extension of the rod 201 applies a turning moment to the seat portion in direction of an arrow 258. The turning moment applied by the air spring urges the seat portion 253 to rotate in a direction so as to force the knives 251 and 252 apart, thus increasing strain on the saw.

The air cylinder 200, fitted in the second position 65 (FIG. 4), extends between the counterweight or torque arm 53 and the bracket 69, thus in effect cooperating with the plunger and torgue arm. Resilience of the air cylinder resulting from compressibility of the gas in the cylinder provides a resilient mounting for the first wheel.

The air cylinder 200 includes mutually extensible and retractable first and second portions, the first portion being a cylinder body 260 secured to the outer end 72 of the bracket, and the second portion being the piston rod 201 which cooperates with the torque arm 53. The cylinder 200 has an inlet port 262 and conduit means 263 coupling the inlet port to a reservoir 264 containing a pressurized gas. Further details of the air cylinder 200 are described with reference to FIG. 16. The reservoir has a volume materially larger than volume of the air cylinder, so that when the temperature of the air reservoir remains essentially constant relatively small extensions and retractions of the air spring have a negligible effect on the gas pressure. Thus, small carrier arm rotations about the yoke have a negligible effect on force applied by air cylinder which is in contrast to resulting characteristics of the bandmill if a mechanical spring were to be substituted for the air spring.

The second portion 243 of the means to strain the saw is essentially similar to the first portion 242, and is only briefly described. The second portion 243 has a further first wheel support 269 spaced from the first wheel support 244, the first arbor 56 extending between the wheel supports, the first wheel 11 being straddled by the wheel supports as shown in FIG. 15. A second plunger 270 cooperates with the support 269 and it is adapted for axial movement within the column parallel to movement of the plunger 51. A second knife edge seat assembly 272 (broken outline in FIG. 15) has a seat portion cooperating with knives coupled to the plunger and a respective strain rod similarly to the first portion, details of which are not shown. A rocker shaft 274 couples the seat portions of each knife seat assembly for mutual rotation for equalising turning moments on each portion. A second air cylinder 276 extends between a bracket 277 extending from the second plunger and a torque arm (not shown) coupled to the knife edge seat assembly 272. The air cylinder 276 is similarly connected to the reservoir 264 by a conduit means 278. Thus both cylinders are exposed to gas at an equal pressure so that forces applied by each cylinder to the respective torque arms are essentially equal. The rocker shaft equalises any minor differences in forces applied to the strain rods.

Thus each strain portion includes essentially similar carrier arms, each arm carrying a respective end of the first wheel arbor. Essentially similar yokes are secured to the respective plungers and each yoke hinges a respective carrier arm to permit concurrent swinging of the carrier arms relative to the yokes to strain the saw. Each plunger has a respective strain rod extending within the plunger tube, the seat portion of each knife edge seat assembly being positioned within the respective plunger tube. Force from the seat portion is transmitted equally to the strain rods, thence to the carrier arms of the wheel support.

Note that independent raising or lowering of one plunger tube relative to the other for upper wheel arbor tilting as in prior art bandmills is possible without further material modification to the bandmill when air cylinders are fitted as above.

FIG. 16

The air cylinder 131 is one type of an air spring, being an air cylinder as manufactured by the Bellofram Products Company previously referred to. The cylinder body 260 has the inlet port 262 to receive a connector from the conduit means 263 (not shown). The cylinder body 260 has an outer end 281 having means to secure the cylinder body, and an inner end having a bore 282 which provides clearance for the piston rod 201. The piston rod floats within the bore 282, and for normal ranges of movement does not contact sidewalls of the bore, thus essentially eliminates friction between the piston and the bore. The piston rod 201 has an inner end 284 secured to a piston 285, the piston having an annular flange 287 extending there around and spaced inwards from an inner wall of the cylinder body 260. A flexible impermeable diaphragm 289 extends between an inner end wall 288 of the outer end 281 of the cylinder and the piston 285. The diaphragm has a fold 290 which permits essentially frictionless movement between the piston and the cylinder along the central axis 291, the diaphragm defining in part a chamber 292 between the piston and a portion of the cylinder.

The rolling diaphragm type of air cylinder is a preferred type of air spring because, for a normal range of extension and retraction it has a generally linear characteristic of force against extension. Thus it produces force directly proportional to extension. Extension and retraction of the piston in normal operation of the bandmill is within a relatively narrow range of about one half of an inch, and thus the piston operates well clear of upper and lower limits of travel. When the cylinder is fitted as described above, stops (not shown) limit swinging of the torque arm to prevent the piston from reaching limits of travel, thus reducing risk of damage to the air cylinder.

FIG. 17

An alternative type of air spring is known as a bellows type and is designated 296, a suitable type being manufactured by the Firestone Industrial Products Company of Noblesville, Indiana, U.S.A., and distributed under a registered trade mark AIRIDE. The bellows type of air spring is equivalent to the rolling diaphragm air cylinder, and has first and second portions 298 and 299, which portions are similarly securable to the torque arm and the bracket 69 of FIG. 14. A flexible membrane 301 extends between the portions and is equivalent to the diaphragm 289 of FIG. 16. An inlet port 303 in the portion 299 connects the air spring through a conduit means to the reservoir (not shown). A circumferential circular hoop 305 forms a pair of annular convolutions 307 and 308 extending around the air spring, the convolutions being folds to permit substantially frictionless extension and retraction of the air spring. Inner and outer ends of the diaphragm have circumferential beads 310 and 311 which retain ends of the diaphragm to the portions 298 and 299 and prevent leakage of gas from the air spring.

Extension characteristics of a bellows type of air spring are generally non-linear towards outer limits of travel when compared with a rolling diaphragm type. For optimum performance when using the bellows type of air spring, the normal range of operation of the bellows is selected to be on the middle, essentially linear characteristic.

Other types of air springs are known, for instance the rolling sleeve type (not shown) also manufactured by the Firestone Industrial Products Company as above.

ALTERNATIVES AND EQUIVALENTS

The invention is shown in use in a vertical bandmill, however with suitable modifications a horizontal bandmill using a similar strain mechanism can be converted to using air cylinders as described above. The invention is shown for use in a conventional vertical symmetrical bandmill in which the upper wheel arm is supported at both ends on two spaced upper wheel supports, each support relating to essentially similar first and second portions of the means to strain the saw. With suitable modifications, one of the upper wheel supports and associated portions could be eliminated as in an overhung type of wheel, which embodiment is not illustrated.

We claim:

1. A bandmill having: a column; a first wheel mounted for rotation on a first arbor; a second wheel mounted for rotation on a second arbor, the wheels being spaced and coplanar and adapted to mount and to drive an endless saw; means to strain the saw supported by the column so that the first arbor can be moved relative to the second arbor, a first portion of the means to strain the saw including:
   a. a first wheel support carrying the first arbor, the support being adapted to move relative to the column to strain the saw,
   b. a plunger having inner and outer ends, the outer end cooperating with the first wheel support, the plunger being supported in the column and being adapted to move axially relative to the column so as to strain the saw, c. a knife edge seat assembly including a first knife cooperating with the first wheel support, a second knife cooperating with the plunger, and a seat portion cooperating with the first and second knives, d. a torque arm coupled to the seat portion, the arm having an inner end mounted for rotation relative to the plunger, e. an extensible and retractible air spring cooperating with the plunger and the torque arm, the air spring having a pressurized gas containing chamber defined in part by a flexible membrane, the chamber having an inlet port, f. means for maintaining the pressurized gas contained in said chamber essentially constant comprising a reservoir to contain pressurized gas and a conduit to connect the reservoir to the inlet port of the air spring so that the air spring contains the pressurized gas and force from the air spring is applied to the first wheel support to provide a resilient mounting for the first wheel.

2. A bandmill as claimed in claim 1 further including:

g. means to maintain the gas in the reservoir at an essentially constant pressure.

3. A bandmill as claimed in claim 1 in which:

i. the first wheel support includes a yoke secured to the plunger and a carrier arm carrying the first wheel arbor, the carrier arm being hinged to the yoke to permit swinging of the carrier arm relative to the plunger so as to strain the saw, ii. a strain rod extends between the knife edge seat assembly and the carrier arm, the strain rod having an outer end cooperating with the carrier arm and an inner end having the first knife cooperating with the portion seat, so that a rotation of the seat portion rotates the carrier arm relative to the plunger.

4. A bandmill as claimed in claim 1 further including a second portion of the means to strain the saw essentially similar to the first portion, the second portion including:

i. a further first wheel support spaced from the first wheel support of the first portion, the first arbor extending between the wheel supports, the first wheel being straddled by the wheel supports, ii. a second plunger cooperating with the further first wheel support and adapted for axial movement within the column parallel to movement of the first plunger, iii. a second knife edge seat assembly having a seat portion, a rocker shaft coupling the seat portions of each knife edge seat assembly for mutual rotation, the arm being coupled to the rocker shaft so as to apply equal turning moments to each seat portion.

5. A bandmill as claimed in claim 4 in which first wheel supports include:

i. essentially similar carrier arms, each carrier arm carrying a respective end of the first wheel arbor, ii. essentially similar yokes secured to outer ends of respective plungers, each yoke hinging a respective carrier arm to permit concurrent swinging of the carrier arms relative to the yokes to strain the saw.

6. A bandmill as claimed in claim 5 in which each portion of the means to strain the saw includes:

i. a respective strain rod, each strain rod having inner and outer ends, each outer end of a strain rod cooperating with the carrier arm of a respective first wheel support, each inner end of the strain rod having a first knife cooperating with the respective seat portion, so that the force from the seat portion is transmitted equally through the strain rods to the carrier arms of the wheel supports.

7. A bandmill as claimed in claim 6 in which:

i. each plunger is a tube, ii. each strain rod extends within a respective tube of the plunger, iii. each seat portion of the knife edge seat assemblies are positioned within the respective tube and are journalled for rotation relative to the tube, the seat portions being positioned so that the rocker shaft extends between respective knife seats.

8. A bandmill as claimed in claim 1 in which the air spring includes mutually extensible and retractible first and second portions, the first portion cooperating with the plunger, the second portion cooperating with the arm; the membrane is a flexible impermeable diaphragm extending between respective portions so as to define in part the chamber between the portions, the diaphragm having a fold to permit essentially frictionless movement between the portions.

9. A bandmill as claimed in claim 1 further including:

i. a bracket having an inner portion secured to the plunger tube, and an outer portion providing a mounting for the air spring, so that the air spring extends between the bracket and the torque arm.

10. A bandmill as claimed in claim 8 further including:

i. a bracket having an inner portion secured to the plunger tube and an outer portion providing a mounting for the air spring, so that the air spring extends between the torque arm and the bracket, and in which:

ii. the air spring is a rolling diaphragm air cylinder, the first portion being a cylinder secured to the bracket, and the second portion being a piston having a piston rod, the piston rod being hinged to the torque arm and disposed so as to be essentially parallel to the strain rod, the fold of the diaphragm extending between the piston and the cylinder.

* * * * *